(12) United States Patent
Putz

(10) Patent No.: US 12,345,304 B2
(45) Date of Patent: Jul. 1, 2025

(54) BRAKE DEVICE

(71) Applicant: GREENBRAKES GMBH, Hartberg (AT)

(72) Inventor: Michael Putz, Sebersdorf (AT)

( * ) Notice: Subject to any disclaimer, the term of this patent is extended or adjusted under 35 U.S.C. 154(b) by 747 days.

(21) Appl. No.: 17/606,322

(22) PCT Filed: Mar. 13, 2020

(86) PCT No.: PCT/EP2020/056954
§ 371 (c)(1),
(2) Date: Oct. 25, 2021

(87) PCT Pub. No.: WO2020/216527
PCT Pub. Date: Oct. 29, 2020

(65) Prior Publication Data
US 2022/0196094 A1    Jun. 23, 2022

(30) Foreign Application Priority Data

Apr. 24, 2019 (AT) ............................... A 60108/2019
Jul. 9, 2019 (AT) ............................... A 50625/2019

(51) Int. Cl.
*F16D 55/08*  (2006.01)
*F16D 55/226*  (2006.01)
(Continued)

(52) U.S. Cl.
CPC ........... *F16D 65/18* (2013.01); *F16D 55/226* (2013.01); *F16D 2055/0008* (2013.01);
(Continued)

(58) Field of Classification Search
CPC .............. F16D 2121/24; F16D 2125/20; F16D 2125/26; F16D 2125/28; F16D 2125/30;
(Continued)

(56) References Cited

U.S. PATENT DOCUMENTS 4,109,765 A     8/1978  Johannesen
5,087,907 A  *  2/1992  Weiler .............. F16D 55/22655
                                                                200/61.4
(Continued)

FOREIGN PATENT DOCUMENTS

CN      107477109 A  * 12/2017 ............. F16D 55/22
CN      107965536 A     4/2018
(Continued)

OTHER PUBLICATIONS

Machine translation of CN 107477109 (no date).*
(Continued)

*Primary Examiner* — Nicholas J Lane
(74) *Attorney, Agent, or Firm* — Liang & Hennessey LLP; Brian Hennessey

(57) ABSTRACT

A brake device includes a brake caliper with a first frictional surface and a first actuation surface, a pressing part of the brake device being linearly guided along a first straight line on the brake caliper. The pressing part has a second frictional surface and a second actuation surface, a region being provided between the first frictional surface and the second frictional surface for arranging a brake element. The brake device has a rotatable spreading element which interacts with the first actuation surface and the second actuation surface. During a rotation of the spreading element, the rotation occurring in order to actuate the brake device, a first spreading element surface is in direct contact with a first rolling surface and rolls substantially on the first rolling surface, and the first rolling surface corresponds to the first actuation surface or the second actuation surface.

15 Claims, 3 Drawing Sheets

(51) Int. Cl.
*F16D 65/18* (2006.01)
*F16D 55/00* (2006.01)
*F16D 121/24* (2012.01)
*F16D 125/32* (2012.01)

(52) U.S. Cl.
CPC .. *F16D 2055/0016* (2013.01); *F16D 2121/24* (2013.01); *F16D 2125/32* (2013.01)

(58) Field of Classification Search
CPC .... F16D 2125/32; F16D 65/18; F16D 55/226; F16D 2055/0008; F16D 2055/0016
See application file for complete search history.

(56) References Cited

U.S. PATENT DOCUMENTS

| | | | | |
|---|---|---|---|---|
| 5,400,875 | A | * | 3/1995 | Anthony ............... F16D 65/183 |
| | | | | 188/106 F |
| 5,433,298 | A | * | 7/1995 | Antony ................. F16D 65/183 |
| | | | | 188/71.9 |
| 5,501,305 | A | * | 3/1996 | Stalmeir ................ F16D 65/14 |
| | | | | 188/153 R |
| 5,547,048 | A | * | 8/1996 | Anthony ................ F16D 65/18 |
| | | | | 188/72.9 |
| 2002/0017437 | A1 | | 2/2002 | Ortegren et al. |
| 2006/0124407 | A1 | * | 6/2006 | Maehara ............... F16D 65/567 |
| | | | | 188/72.7 |
| 2013/0126280 | A1 | | 5/2013 | Gutelius |
| 2019/0024740 | A1 | * | 1/2019 | Taylor .................... F16D 65/52 |

FOREIGN PATENT DOCUMENTS

| | | |
|---|---|---|
| DE | 102017004436 A1 | 11/2018 |
| EP | 0291071 A2 | 11/1988 |
| EP | 0614024 A1 | 9/1994 |
| EP | 0698749 A2 | 2/1996 |
| WO | 01044677 A1 | 6/2001 |
| WO | WO-03042565 A1 * 5/2003 | ........... F16D 55/226 |

OTHER PUBLICATIONS

Office Action in Austria Application No. A 50625/2019, mailed Jan. 7, 2020, 3 pages.

International Search Report and Written Opinion in International Application No. PCT/EP2020/056954, mailed May 29, 2020, 17 pages.

* cited by examiner

BRAKE DEVICE

CROSS-REFERENCE TO RELATED APPLICATIONS

The present application is a national phase application of PCT Application No. PCT/EP2020/056954, filed Mar. 13, 2020, entitled "BRAKE DEVICE", which claims the benefit of Austrian Patent Application No. A60108/2019, filed Apr. 24, 2019, and Austrian Patent Application No. A50625/2019, filed Jul. 9, 2019, each of which is incorporated by reference in its entirety.

BACKGROUND OF THE INVENTION

1. Field of the Invention

The invention relates to a brake device.

2. Description of the Related Art

Brake devices are known which have a brake caliper having a first frictional surface, a pressing part with a second friction surface being movably mounted on the brake caliper. The body to be braked, usually a brake disk, is arranged between the two frictional surfaces, wherein the two friction surfaces are pressed onto the body to be braked in order to actuate the brake device. One possibility for actuating the brake devices is hydraulic actuation, in which the contact force for actuating the brake device is provided directly via hydraulic pressure.

It is also known to apply the contact force of the frictional surfaces mechanically by means of a lever. Such a design is widespread in trucks with compressed air brake systems, since the compressed air alone usually does not apply enough pressure to adequately actuate the brake devices. A spreading element designed as a lever is rotated by means of a piston actuated by compressed air, wherein the rotation of the lever presses the pressing part off the brake caliper and thus compresses the frictional surfaces. As a result of the rotation of the spreading element, in addition to a component of movement of the two frictional surfaces with respect to one another along a straight line, there is usually also a component of movement perpendicular to this straight line. This either means that the pressing part cannot be guided linearly on the brake caliper, which necessitates a correspondingly complex mounting of the pressing part on the brake caliper, or, in the case of linear guidance of the pressing part on the brake caliper, that relative movements between the pressing part, the spreading element and the caliper transverse to the direction of the linear guide result.

DE 10 2017 004 436 A1 discloses a brake device with a spreading element designed as a lever. The spreading element is actuated by means of a linearly guided plunger, wherein the plunger rests against the spreading element at a first end and is able to be displaced at a second end by means of an actuation worm. The spreading element is conventionally shaped so that a rotation of the spreading element causes a lateral component of movement on the pressing part.

A brake device with a spreading component is known from WO 03/042565 A1. The spreading element can be pivoted by means of a lever, wherein the spreading element is arranged between two actuation surfaces which can be linearly displaced with respect to one another. When the spreading element is rotated, a lateral component of movement occurs between the spreading element and the actuation surface, wherein either the spreading element rubs against the actuation surface or the rolling body performs a compensating movement.

A brake device having a spreading element is known from WO 01/044677 A1, wherein an actuation mechanism for the spreading element is designed in such a way that actuation energy is stored as spring energy. The spreading element itself exerts a lateral component of movement on the actuation surface when it is rotated.

The disadvantage here is that these relative movements lead to rubbing between different surfaces when the brake device is actuated, as a result of which the wear and the actuation effort for the brake device are significantly increased. Although there is the possibility of absorbing these relative movements transversely to the direction of the linear guide via further roller bearings or compensating devices, this increases the manufacturing effort or the size of the brake device and the operating effort for the brake device is often also increased.

SUMMARY OF THE INVENTION

The object of the invention is therefore to specify a brake device of the type mentioned at the outset with which the mentioned disadvantages can be avoided and which functions reliably and with low actuation resistances with little wear, but can still be designed in a simple and compact manner.

According to the invention, this is achieved by the features of the claims.

This results in the advantage that the brake device functions reliably and with low actuation resistances with little wear, but can nevertheless be designed in a simple and compact manner. However, it has also been surprisingly shown that it is possible to guide the pressing part linearly along the first straight line on the brake caliper, wherein the first spreading element surface is in direct contact with one of the two actuation surfaces during actuation and rolls thereon, wherein the relative movements of the pressing part to the brake caliper normal to the first straight line can be kept negligibly small. When the spreading element is rotated from a starting position, a relative change in distance caused by the rotation transversely to the first straight line between the two spreading element surfaces is balanced at least in part by the rolling movement of at least one of the spreading element surfaces on at least one of the actuation surfaces, whereby the relative movement between the brake caliper and the pressing part normal to the first straight line can be kept low. As a result of the direct rolling of the spreading element on at least one of the two actuation surfaces, the brake device 1 manages without an additional roller bearing at this critical point. The interaction of the spreading element with the two actuation surfaces for the actuation resistance and wear is particularly important here, since the forces must be applied directly to the frictional surfaces here. The brake device can therefore be designed with particularly few moving parts, which makes it very reliable.

The dependent claims relate to further advantageous embodiments of the invention.

Express reference is hereby made to the wording of the claims, whereby the claims are inserted into the description at this point by reference and are considered to be reproduced verbatim.

BRIEF DESCRIPTION OF THE DRAWINGS

The invention is described in more detail with reference to the accompanying drawings, in which only preferred embodiments are shown by way of example. In the drawings.

DETAILED DESCRIPTION

Figure 1:
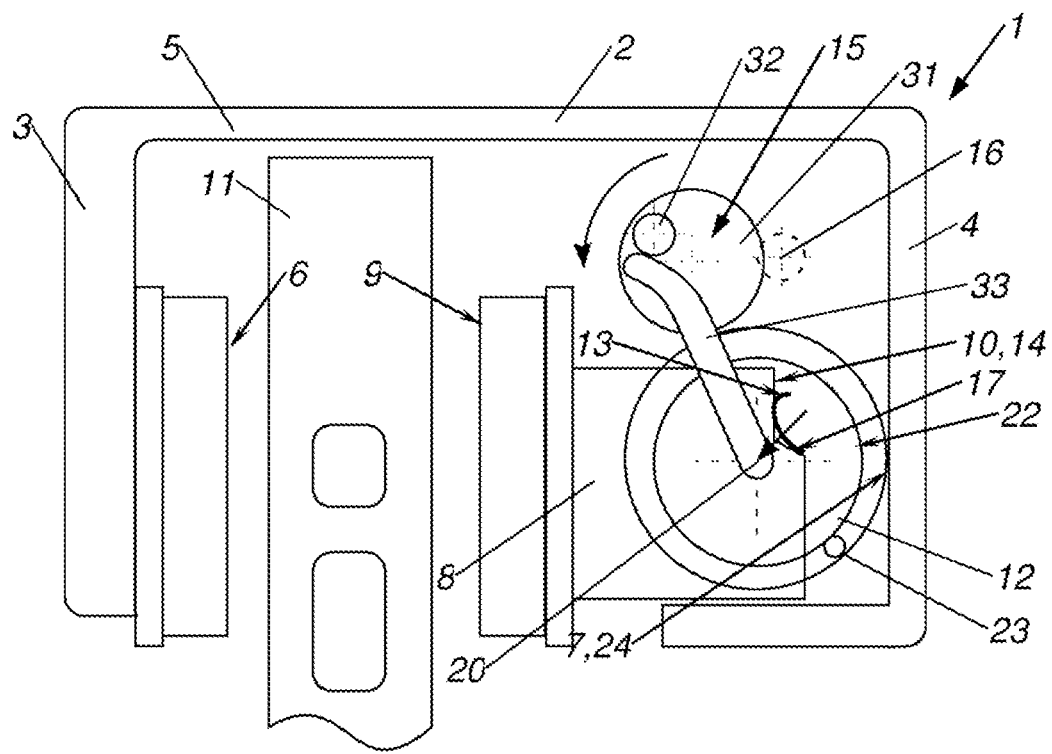
FIG. 1 shows a first preferred embodiment of the brake device in a side view as a principle illustration.

FIGS. 1 to 4 show at least parts of a preferred embodiment of a brake device 1 comprising a brake caliper 2 having a first leg 3, a second leg 4 and a connecting section 5 connecting the first leg 3 to the second leg 4, wherein a first frictional surface 6 is arranged on a first inner side of the first leg 3, and a first actuation surface 7 is arranged on a second inner side of the second leg 4, wherein a pressing part 8 of the brake device 1 is guided linearly along a first straight line on the brake caliper 2, wherein the pressing part 8 comprises a second frictional surface 9 facing the first frictional surface 6, as well as a second actuation surface 10 facing away from the second frictional surface 9, wherein a region between the first frictional surface 6 and the second frictional surface 9 is provided for the arrangement of a brake element 11, wherein the brake device 1 comprises a rotatable spreading element 12 cooperating with the first actuation surface 7 and the second actuation surface 10, wherein when the spreading element 12 is rotated to actuate the brake device 1, a first spreading element surface 13 is in direct contact with a first rolling surface 14 and substantially rolls on the first rolling surface 14, and wherein the first rolling surface 14 corresponds to the first actuation surface 7 or the second actuation surface 10.

This results in the advantage that the brake device 1 functions reliably and with low actuation resistances with little wear, but can nevertheless be designed in a simple and compact manner. However, it has also been surprisingly shown that it is possible to guide the pressing part 8 linearly along the first straight line on the brake caliper 2, wherein the first spreading element surface 13 is in direct contact with one of the two actuation surfaces 7, 10 during actuation and rolls thereon, wherein the relative movements of the pressing part 8 to the brake caliper 3 normal to the first straight line can be kept negligibly small. When the spreading element is rotated from a starting position 18, a relative change in distance caused by the rotation transversely to the first straight line between the two spreading element surfaces 13, 22 is balanced at least in part by the rolling movement of at least one of the spreading element surfaces 13, 22 on at least one of the actuation surfaces 7, 10, whereby the relative movement between the brake caliper 2 and the pressing part 8 normal to the first straight line can be kept low. As a result of the direct rolling of the spreading element 12 on at least one of the two actuation surfaces 7, 10, the brake device 1 manages without an additional roller bearing at this critical point. The interaction of the spreading element 12 with the two actuation surfaces 7, 10 is particularly important here for the actuation resistance and wear, since here the forces must be applied directly to the frictional surfaces 6, 9. The brake device 1 can therefore be designed with particularly few moving parts, which makes it very reliable.

In particular, a method for operating the brake device in question can also be provided.

The brake device 1 is designed in particular as a vehicle brake and comprises a brake caliper 2 which has two opposing legs 3, 4 which are connected to one another, in particular fixedly, via a connecting section 5. The brake caliper 2 can in particular be designed in one piece. Alternatively, the brake caliper 2 can be composed of several parts. The pressing part 8 is at least indirectly supported on the brake caliper 2 in such a way that the pressing part 8 can execute a translational movement in relation to the brake caliper 2 along the first straight line. Relative movements between the pressing part 8 and the brake caliper 2 transversely to the first straight line are only possible within the scope of the usual tolerances. The mounting of the pressing part 8 relative to the brake caliper 2 is not explicitly shown in FIGS. 1 and 3.

The first frictional surface 6 and the second frictional surface 9 are arranged on the first leg 3 and on the end of the pressing part 8 facing the first leg 3. The frictional surfaces 6, 9 can in particular be designed as replaceable brake shoes. The frictional surfaces 6, 9 delimit a receiving area for the brake element 11 to be braked on both sides and are provided to brake a movement of the brake element 11 relative to the brake device 1 by means of a friction force. The translational movement of the pressing part 8 relative to the brake caliper 2 leads analogously to a relative movement of the frictional surfaces 6, 9 to one another in the direction of the first straight line.

A wheel bearing comprising a brake disk as the brake element 11 and the brake device 1 can preferably be provided, wherein an axis of rotation of the brake disk runs parallel to the first straight line.

A vehicle comprising at least one wheel bearing can preferably be provided.

Furthermore, a vehicle comprising a brake device 1 can be provided.

The vehicle can in particular be a car, truck or trailer.

A brake device 1 with a rotating brake disk can also be provided for other vehicles, for example trains and propellers.

Furthermore, the brake element 11 can also be provided for a translational movement relative to the brake device 1, in particular in the case of a brake rail for an elevator.

It is also conceivable to use the brake device 1 in a stationary machine.

The actuation surfaces 7, 10 are arranged on the second leg 4 and on the end of the pressing part 8 facing away from the first leg 3. The actuation surfaces 7, 10 are provided for the purpose of absorbing the pressing forces which are transmitted via the brake caliper 2 and the pressing part 8 to the respective frictional surface 6, 9.

In particular, it can be provided that at least when the brake device 1 is actuated, the first actuation surface 7 is substantially fixed in relation to the first frictional surface 6, and/or that the second actuation surface 10 is substantially in a fixed position in relation to the second frictional surface 9. It can be provided here that any wear can be compensated for by the wear adjuster 26, but otherwise the first actuation surface 7 is fixed in relation to the first frictional surface 6 and/or the second actuation surface 10 is in a fixed position in relation to the second frictional surface 9.

A rotatable spreading element 12 is provided for actuating the brake device 1, wherein the spreading element 12 cooperates with the first actuation surface 7 and the second actuation surface 10. The spreading element 12 and the actuation surfaces 7, 10 are shaped such that when the spreading element 12 rotates in a first direction of rotation, the spreading element 12 presses the two actuation surfaces 7, 10 apart, so that the pressing part 8 presses the second frictional surface 9 in the direction of the first frictional surface 6 and the brake caliper 2 pulls the first frictional surface 6 in the direction of the second frictional surface 9.

The first spreading element surface 13 is preferably fixed in relation to the remaining spreading element 12. Furthermore, it can be provided that the second spreading element surface 22 is also in a fixed position relative to the remaining spreading element 12, therefore also relative to the first spreading element surface 13.

The spreading element 12 can particularly preferably be designed in one piece.

The rotation of the spreading element 12 takes place in a plane of rotation which is spanned by the first straight line and a second straight line that is orthogonal to the first straight line. This plane of rotation is therefore orthogonal to the axis of rotation 20 of the spreading element.

Figure 2:
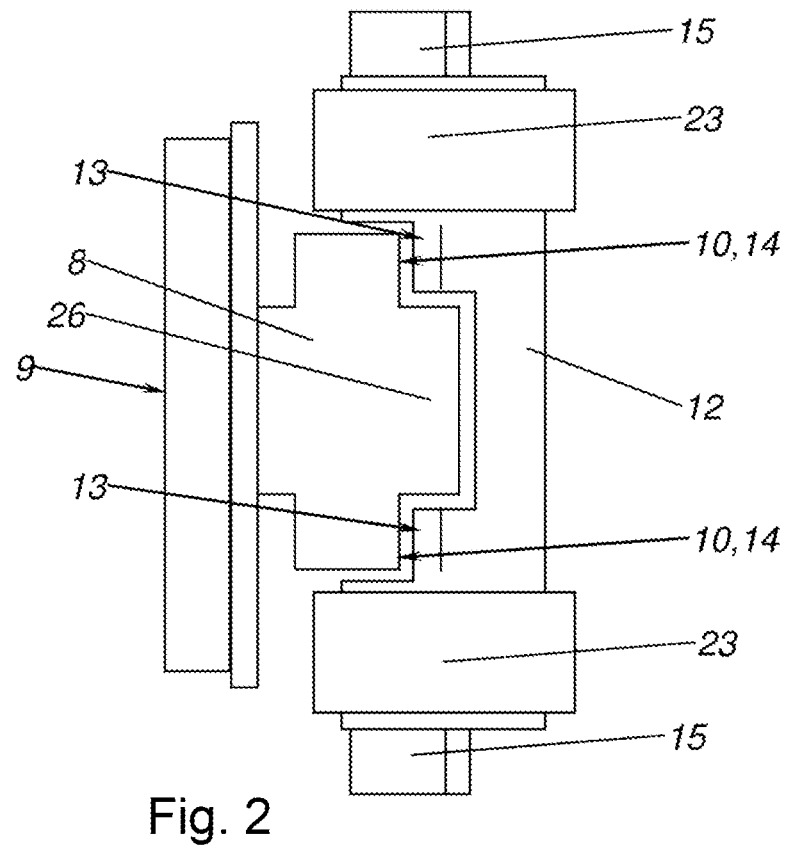
FIG. 2 shows parts of the first preferred embodiment of the brake device in a plan view as a principle illustration.
Figure 3:
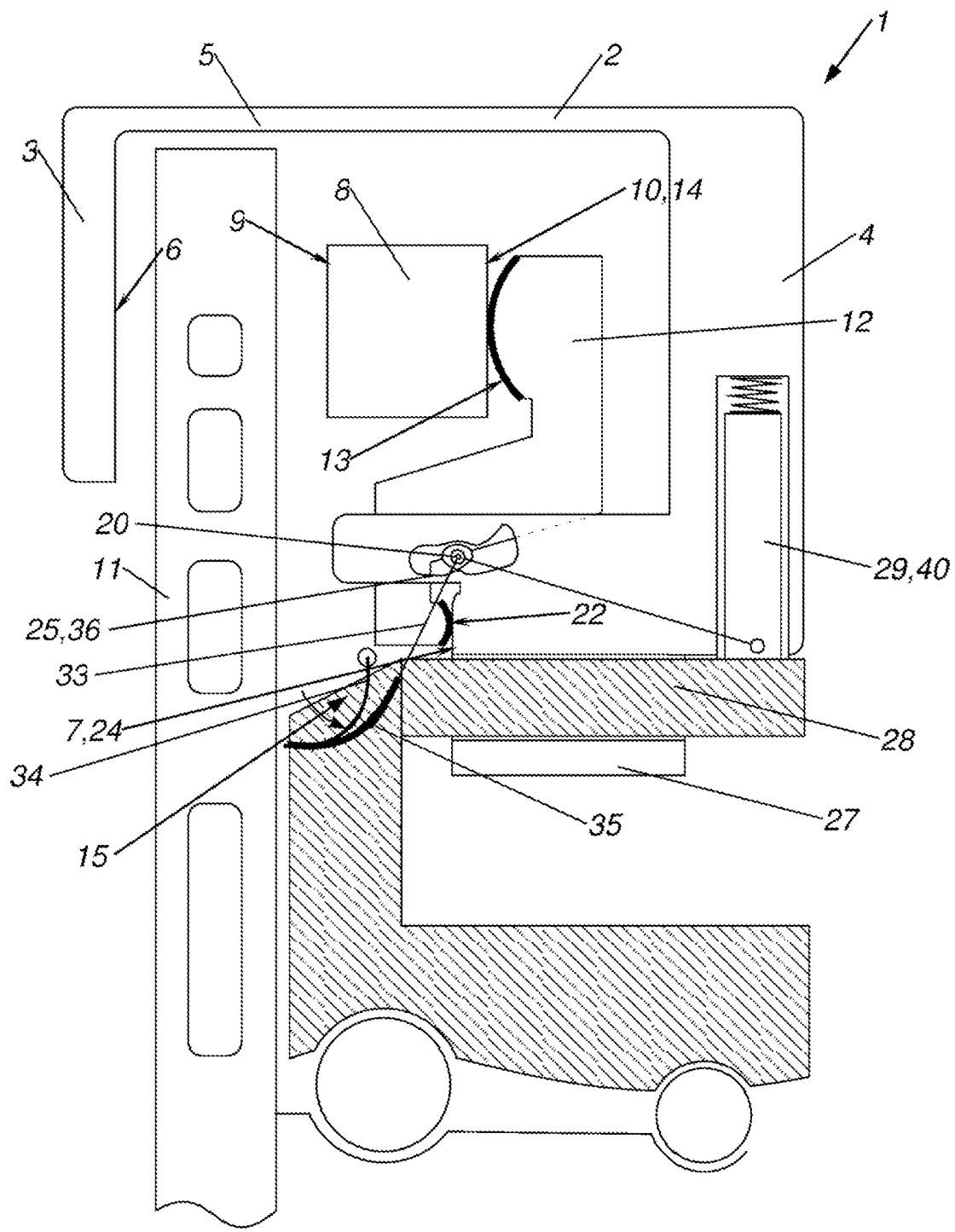
FIG. 3 shows a second preferred embodiment of the brake device in a side view as a principle illustration.

The spreading element 12 can in particular be rotated between a starting position 18 and an end position 30. The starting position corresponds here to a released state of the brake device 1. The end position 30 corresponds to a state of the brake device 1 at maximum braking force. For the actuation of the brake device 1, the spreading element 12 is rotated from the starting position 18 in the direction of the end position 30. In FIGS. 1 and 3, the spreading element 12 is shown in the starting position 18. In FIG. 2, part of the spreading element 12 is shown both in the starting position 18 and in the end position 30.

In particular, it can be provided that the starting position 18 corresponds to a starting angle of the spreading element 12 and the end position 30 corresponds to an end angle of the spreading element 12, wherein the starting angle and the end angle span an operating angle range of the spreading element 12 in which operating angle range the spreading element 12 can be rotated in the intended operation. The operating angle range can in particular have an angle of at least 15°, in particular at least 20°, particularly preferably at least 25°. This comparatively large operating angle range enables a compact design of the brake device 1. The operating angle range can preferably have an angle of at most 35°.

When the spreading element 12 is rotated to actuate the brake device 1, the first spreading element surface 13 is in direct contact with the first rolling surface 14, wherein the spreading element surface 13 essentially rolls on the first rolling surface 14. The first rolling surface 14 can correspond to either the first actuation surface 7 or the second actuation surface 10. The fact that the first spreading element surface 13 is in direct contact with the first rolling surface 14 means that no additional rolling bodies are arranged between the first spreading element surface 13 and the first rolling surface 14. Substantially rolling means that a slight slippage is possible between the first spreading element surface 13 and the first rolling surface 14 when rolling.

The first rolling surface 14 particularly preferably corresponds to the second actuation surface 10, as is shown by way of example in the preferred embodiments in FIGS. 1 to 4. In this case, when the spreading element 12 is rotated to actuate the brake device 1, the first spreading element surface 13 is in direct contact with a second actuation surface 10 and substantially rolls off on the second actuation surface 10.

The spreading element 12 comprises a second spreading element surface 22 which interacts with the actuation surface 7, 10 which is not the first rolling surface 14. In particular, it can be provided that the second spreading element surface 22 interacts with the first actuation surface 7.

When the brake device 1 is actuated, the actuation surfaces 7, 10 are pressed, in opposite directions parallel to the first straight line by the rotation of the spreading element 12, from the spreading element surfaces 13, 22.

When the brake device 1 is actuated, the first spreading element surface 13 and the second spreading element surface 22 rotate about a common axis of rotation 20 of the spreading element 12. The first spreading element surface 13 is arranged opposite the axis of rotation 20 and/or the second spreading element surface 22 in such a way that when rotating from the starting position 18 in the direction of the end position 30, a distance between the first spreading element surface 13 and the rotation axis 20 and/or the second spreading element surface 22 steadily increases. However, due to the simultaneous rolling of the first spreading element surface 13 on the rolling surface 14, i.e. the actuation surface 7, 10 in contact with the first spreading element surface 13, this relative change in the distance between the first spreading element surface 13 and the axis of rotation 20 and/or the second spreading element surface 22 parallel to the second straight line with respect to the rolling surface 14 is again at least partially balanced.

Furthermore, it can be provided that the spreading element 12 is operatively connected to an actuation mechanism 15, wherein the spreading element 12 is rotatable by means of the actuation mechanism 15. The actuation mechanism 15 can in particular be actuated via an actuator. The actuation mechanism 15 is designed to rotate the spreading element 12 in a predeterminable manner about the axis of rotation 20.

It can preferably be provided that, in order to rotate the spreading element 12, the spreading element 12 is operatively connected to an electric motor 16 via the actuation mechanism 15. Here, the electric motor 16 forms the actuator for the actuation mechanism 15. The actuation mechanism 15 translates a rotational movement of the electric motor 16 into a rotational movement of the spreading element 12. The electric motor 16 can in particular be a servo motor. The electric motor 16 can in particular be attached to the brake caliper 2. In terms of effect, actuation by means of an electric motor 16 differs from actuation by means of hydraulics or pneumatics in that a position of the spreading element 12 can be specified by means of the electric motor 16, while with hydraulics or pneumatics only a torque of the spreading element 12 can be specified. As a result, the requirements of an electric motor 16 in terms of the precision of the movement sequences of the actuation mechanism 15 and of the spreading element 12 are significantly higher, since incorrect positions cannot simply be automatically compensated for. Although an electric motor 16 otherwise has many advantages over hydraulics or pneumatics, electromechanical brakes are often very complex. The brake device 1 in question with an electric motor 16, on the other hand, allows precise specification of the movement sequences with a comparatively simple structure.

It is also particularly preferably provided that the electric motor 16 is designed as a brushless direct current motor. Such an electric motor 16 is also referred to in English as a BLDC motor, BLDC—in a manner known per se—standing for Brushless Direct Current.

In particular, a brake system comprising at least one brake device 1 can be provided, wherein the brake system in particular has at least one control and monitoring unit and at least one regulator in order to control the electric motor 16 or to enable a corresponding regulation of the electric motor 16. The controller is electrically connected to the electric motor 16, and is designed, for example, to include an inverter circuit or a bridge circuit. The controller can be designed as any desired controller and as a result of any desired method, provided that the controller is designed or able to control, in particular a position and/or a torque. The controller must of course be technically capable of regulating the respectively selected electric motor 16.

In the presently preferred embodiment of the electric motor 16 as a BLDC motor, it is preferably provided that the controller is designed as a controller specially designed or provided for BLDC motors. Such controllers, which include position, torque and speed control, are known in the relevant technical field of controlling BLDC motors. In particular, it is provided that such a controller transfers position, torque limitation, and speed limitation to a control and monitoring unit at the same time.

In particular, it can be provided that the control and monitoring unit is designed to receive a braking action request on the input side, and to generate a braking control signal based on the braking action request and output it to the controller 10 of the electric motor 16.

The regulation of the electric motor can in particular take place without force sensors, that is to say without the aid of additional force sensors.

The regulation of the electric motor can particularly preferably take place substantially on the basis of a current consumption of the electric motor 16. In this case, substantially on the basis of a current consumption means that the regulation takes place predominantly on the basis of the current consumption of the electric motor 16, while any other measured values are only used for a correction function. The power consumption of the electric motor 16 allows conclusions to be drawn about the contact pressure of the spreading element 12 and thus the braking force of the brake device 1. A regulation of this type has the advantage that it is particularly simple and does not depend much on additional sensors, since the current consumption of the electric motor 16 is easy to measure. A disadvantage of such a control is often that variable internal resistances of the brake device 1 change the power consumption of the electric motor 16 in order to reach a certain position, which would require complex corrections. Due to the structure with the rolling spreading element, however, the variable internal resistances can be kept low, whereby such a regulation is particularly advantageous.

Here, the control and monitoring unit can also be designed to determine from at least one first value of at least one first operating parameter of at least one part of the brake device, determined during a first movement of the spreading element 12 by means of the electric motor 16, as well from at least one second value of the first operating parameter of the part of the brake device 1, determined during a second movement of the spreading element 12 counter to the first movement by means of the electric motor 16, at least one operating behavior value, in particular an operating behavior value, preferably an operating behavior function, for a real operating behavior of the brake device 1 in question.

Furthermore, by comparing the at least one real operating behavior value with at least one stored operating behavior expectation, the control and monitoring unit can determine at least one correction factor, in particular at least one correction factor set, preferably at least one correction curve, and furthermore the brake control signal in order to correct the at least one correction factor, in particular the correction factor set, preferably the correction curve, and to control the controller with the corrected brake control signal.

The first operating parameter may preferably be a current consumption of the electric motor 16, wherein the first value is a first current consumption of the electric motor 16, and the second value is a second current consumption of the electric motor 16.

In particular, the control and monitoring unit can furthermore be designed to control the electric motor 16 in at least one period of time that is free of braking action requirements in such a way that the first movement and the second movement of the friction surface 6 only take place within a gap between the frictional surface 6 and the brake element 11, i.e. the frictional surface 6 does not contact the brake element 11. As a result of the two movements, the expected operating behavior can therefore be continuously determined during operation without the function of the brake device being impaired.

Furthermore, it can be provided that the brake system furthermore has at least one brake temperature sensor which is connected to the control and monitoring unit and which is preferably arranged in the region of the at least one frictional surface 6, 9.

It can preferably be provided that the actuator, in particular the electric motor 16, is designed to move the spreading element 12 from the starting position 18 into the end position 30. If the actuator fails, the brake device 1 remains in an unbraked state.

Alternatively, it can be provided that the spreading element 12 can be actuated by hydraulics or pneumatics.

Alternatively, it can be provided that an actuation spring exerts a force on the actuation mechanism 15, which acts in the direction of the end position 30, and that the actuator, in particular the electric motor 16, counteracts the actuation spring. In this case, the brake device 1 brakes automatically if the actuator fails.

Furthermore, it can be provided that a second actuator is operatively connected to the actuation mechanism 15. This second actuator can in particular be a parking brake activation unit. As a result, the same brake device 1 can be used both for braking a vehicle during operation and for parking.

The actuation mechanism 15 can be operatively connected to the two actuators in such a way that the first actuator is disengaged when the second actuator is actuated. The second actuator can, however, also be used to still actuate the brake device 1 safely in the event of a failure of the electric motor 16.

The second actuator can in particular be a cable pull. A parking brake can easily be operated with a cable.

The second actuator can alternatively be a second electric motor. The second electric motor can in particular have a lower power than the electric motor 16.

It can particularly preferably be provided that the actuation mechanism 15 has a non-linear translation between a rotation of the electric motor 16 and a rotation of the spreading element 12. This non-linearity is a transmission ratio that changes over the actuation movement. Due to the non-linear translation of the actuation mechanism 15, the varying torque for rotating the spreading element 12 can be compensated for in the operating angle range. This varying torque is caused by the fact that in an initial range of the operating angle range the spreading element 12 only has to apply the force to overcome the air gap, while when the frictional surfaces 6, 9 come into contact with the brake element 11, the force required for further rotation increases considerably due to the contact pressure. Another advantage of the non-linear translation of the actuation mechanism 15 is that when designing the spreading element 12, less attention has to be paid to the non-linearity of the translation of the spreading element 12, whereby the spreading element 12 can be optimized without problem with regard to a particularly small deflection during actuation transversely to the first straight line.

The actuation mechanism 15 can further have a non-linear translation between an actuation of the second actuator and/or the actuation spring and a rotation of the spreading element 12.

The actuation mechanism 15 can in particular be designed in such a way that a motor torque of the electric motor 16 required to actuate the brake device 1 is substantially constant in a large part of the operating angle range.

The non-linear translation of the actuation mechanism 15 is preferably designed in such a way that the first frictional surface 6 is moved to bridge an air gap up to the brake element 11 at a higher speed than when the first frictional surface 6 is already in contact with the brake element 11 during a braking process.

A translation of the actuation mechanism 15 can vary within the operating angle range by a factor of up to 1:15, preferably up to 1:8.

The non-linear translation can take place by rolling on curves with non-constant curvatures, and/or via non-circular gear segments and/or gears, and/or by means of other variable normal distances such as levers and rods.

It can particularly preferably be provided that the spreading element 12 is connected to a lever 33, in particular is fixedly connected, with pivoting of the lever 33 rotating the spreading element 12.

It can preferably be provided that the actuation mechanism 15 comprises a wheel 31 driven by the electric motor 16 with a control cam 32, and that the control cam 32 interacts with a lever 33 of the spreading element 12. Due to the arrangement of the wheel 31 and the shape of the lever 33, the non-linear translation can be easily implemented. Such a configuration of the actuation mechanism 15 is shown by way of example in FIG. 1.

It can preferably be provided that the electric motor 16 rotates a first control curve 34, which first control curve 34 rolls with a second control curve 35 on the lever 33 of the spreading element 12 in the operating angle range substantially without slipping. This is shown by way of example in FIG. 3, wherein the rotation of the first control cam 34 by the electric motor 16 is indicated by an arrow. The slip-free rolling of the two control curves 34, 35 can take place by frictional engagement or by means of a toothing.

Furthermore, it can be provided that the lever 33 is actuated by means of a control cam.

Alternatively, an actuation mechanism 15 with a linear translation could also be provided.

It can preferably be provided that the brake device 1 comprises a housing, and that the actuation mechanism and the electric motor 16 are arranged within the housing.

The first rolling surface 14 is preferably substantially orthogonal to the first straight line. As a result, a contact pressure of the first spreading element surface 13 parallel to the first straight line does not result in any substantial force component normal to the first straight line. A slight deviation of the first rolling surface 14 from this alignment is possible, however, provided that the friction between the first rolling surface 14 and the first spreading element surface 13 is sufficient to prevent sliding. The first rolling surface 14 can in particular have flat areas and/or curved areas.

Preferably, it can be provided that on an edge of the first rolling surface 14 a support surface 17 arranged obliquely to the first rolling surface 14 for the first spreading element surface 13 is formed, wherein the support surface 17 supports the first spreading element surface 13 in an initial position 18 of the spreading element 12 against forces transverse to the first straight line. This support surface 17 provides additional support for the spreading element 12 in the starting position 18 against a force of the actuating mechanism 15 on the spreading element 12 normal to the first straight line. This enables a particularly compact design of the actuation mechanism 15, in which essential force components are also exerted on the spreading element 12 by the actuation mechanism 15 transversely to the first straight line. In the starting position 18 in particular, the first spreading element surface 13 has not yet built up sufficient pressure on the first rolling surface 14, so that a correspondingly oblique force could lead to a misalignment. This undesired force component is intercepted by the support surface 17 until sufficient pressure for friction has built up between the first spreading element surface 13 and the first rolling surface 14. This is shown by way of example in FIG. 1, in which a rotation of the wheel 31 indicated by an arrow to a force shown by an arrow on the first spreading element surface 13 would have an effect. When the brake device 1 is actuated, the first spreading element surface 13 then rolls away from the support surface 17.

According to a first preferred embodiment, it can be provided that the spreading element 12 is mounted on the second spreading element surface 22 in a roller bearing 23, in particular designed as a needle bearing, on the actuating surface 7, 10 which is not the first rolling surface 14. This means that the first spreading element surface 13 rolls on one of the actuating surfaces 7, 10, which then corresponds to the first rolling surface 14, while the second spreading element surface 22 is mounted on one of the other actuation surfaces 7, 10 in a roller bearing 23, whereby relative movements in the direction equalize the second straight line. This enables a compact design. The roller bearing 23 can in particular be arranged on the first actuation surface 7.

Furthermore, it can preferably be provided that the roller bearing 23 is at least partially in the shape of a cylinder jacket. This means that the roller bearing 23 is designed at least as a circular arc-shaped bearing shell but can also be designed as a completely encompassing circle. As a result, the spreading element 12 rotates in a defined manner about an axis of rotation 20 which coincides with the axis of the roller bearing 23. In FIGS. 1 and 2, a rotating roller bearing 23 is indicated by way of example by a single roller body.

It is particularly preferably provided that the roller bearing 23 is part of the brake caliper 2. This means that the arrangement of the axis of rotation 20 of the spreading element 12 in relation to the brake caliper 2 is fixed in position. This enables a particularly simple and less error-prone rotation of the spreading element by means of an electric motor 16 arranged on the brake caliper 2.

According to a second preferred embodiment, it can be provided that when the spreading element 12 rotates to actuate the brake device 1, a second spreading element surface 22 is in direct contact with a second rolling surface 24 and substantially rolls on the second rolling surface 24, and that the second rolling surface 24 corresponds to the actuation surface 7, 10 which is not the first rolling surface 14. This means that both spreading element surfaces 13, 22 substantially roll on one of the two actuation surfaces 7, 10. As a result, a roller bearing 23 with the corresponding disadvantages is no longer required, as a result of which the brake device can be designed in a particularly simple manner and the actuation resistances are also reduced. The rotation of the two spreading element surfaces 13, 22 takes place with respect to a common axis of rotation 20, which is not positionally fixed either to the brake caliper 2 or to the pressing part 8. The axis of rotation 20 can be arranged substantially between the first spreading element surface 13 and the second spreading element surface 22. The properties of the first spreading element surface 13 described below can also be applied analogously to the second spreading element surface 22.

The profile of the spreading element 12 can, viewed in the plane of rotation of the spreading element 12, be formed in particular substantially Z-shaped, wherein the first spreading element surface 13 and the second spreading element surface 22 are arranged at the opposite ends of the Z-shape and point in an opposite direction.

It can preferably be provided that the spreading element 12 has a guide 25 at its axis of rotation 20, and that the guide 25 supports the axis of rotation 20 of the spreading element 12 against forces transverse to the first straight line, at least in an initial range of the rotation of the spreading element 12 against the brake caliper 2 for actuating the brake device 1. The guide 25 can in particular be arranged in an elongated hole 36 in the brake caliper 2 that runs substantially parallel to the first straight line. The guide 25 has the task, analogous to the support surface 17, of preventing uncontrolled movement of the spreading element 12, especially in the initial area.

In particular, it can be provided that the guide 25, in particular in the elongated hole 36, also makes a substantially rolling movement. For this purpose, the guide 25 and/or the elongated hole 36 can be shaped according to suitable rolling curves.

In particular, the guide 25 can be designed in such a way that the guide provides support only in the initial range of the operating angle range. The initial range can in particular cover a maximum of the first 25% of the operating angle range starting from the initial position 18. Outside the initial range, the position of the spreading element 12 is already sufficiently defined by the friction between the at least one spreading element surface 13, 22 and the at least one rolling surface 14, 24, which would result in a kinematic overdefinition by the guide 25. In terms of construction, this can be achieved by widening the elongated hole 36 or by designing the guide 25 as an open groove.

Alternatively, it can be provided that the support by the guide 25 takes place essentially in the entire operating angle range.

It can in particular be provided that the second spreading element surface 22 is arranged closer to the axis of rotation 20 than the first spreading element surface 13. As a result, an error of the axis of rotation 20 relative to the brake caliper 2 to be compensated by the guide 25 turns out to be less.

When the spreading element 12 is rotated over the entire operating angle range, an error 37 orthogonal to the first straight line, i.e. parallel to the second straight line, is less than 15%, preferably less than 10%, particularly preferably less than 7%, than the deflection 38 of the two actuation surfaces 7, 10, parallel to the first straight line. The error here denotes the deflection of the two actuation surfaces 7, 10 parallel to the second straight line in the case of an ideal rolling movement of the at least one spreading element surface 13, 22 on the at least one rolling surface 14, 24. Even with a precise design of the brake device 1, this small error 37 can be compensated for by a slip between the at least one spreading element surface 13, 22 and the at least one rolling surface 14, 24 or by bearing tolerances of the pressing part 8 with respect to the brake caliper 2.

It can particularly preferably be provided that the first rolling surface 14 spans a plane normal to the first straight line, and that the spreading element 12, the pressing part 8 and the brake caliper 2 are arranged relative to one another in such a way that the axis of rotation 20 of the spreading element 12 in the starting position 18 and the axis of rotation 20 of the spreading element 12 in the end position 30 are arranged on opposite sides of the plane of the rolling surface 14. This means that the axis of rotation 20 of the spreading element 12 traverses the plane spanned by the first rolling surface 14 when it rotates through the entire operating angle range of the spreading element 12.

Particularly preferably it can be provided that a ratio of a first normal distance of the axis of rotation 20 of the spreading element 12 in the starting position 18 relative to the plane of the first rolling surface 14 and a second normal distance of the axis of rotation 20 of the spreading element 12 in the end position 30 relative to the plane of the first rolling surface 14 is between 0.5 and 2, preferably between 0.7 and 1.5, particularly preferably substantially 1. This means that the plane of the first rolling surface 14 is arranged substantially centrally between the starting position 18 and the end position 30 of the axis of rotation 20 of the spreading element 12. A particularly small error 37 can be achieved through this relationship.

Particularly preferably, it can be provided that a profile of the first spreading element surface 13 forms a first rolling curve, that the first rolling curve comprises at least one center of curvature 19, and that with at least a large part of the rotation of the spreading element 12 that takes place to actuate the brake device 1, the axis of rotation 20 of the spreading element 12 is arranged in front of the center of curvature 19 of a point of contact 21 viewed from the point of contact 21 of the first rolling curve in the direction of the first straight line. This means that viewed in the direction from the first rolling surface 14 to the first spreading element surface 13, the axis of rotation 20 in a large part of the rotation that takes place to actuate the brake device 1, in particular at least 80% of the operating angle range, preferably in the entire operating angle range, lies in front of the centers of curvature 19 of the individual points of contact 21, i.e. the evolution of the rolling curve. This has the effect that essentially with every infinitesimal rotation of the spreading element 12 from the starting position 18 in the direction of the end position 30, an enlargement of the projection of the connecting line between the current center of curvature 19 and the axis of rotation 20 in the direction of the first straight line is counteracted by a corresponding rolling of the rolling curve on the rolling surface 14, 24. The second spreading element surface 22 can have a second rolling curve with the same properties.

In particular, in a large part of the rotation that takes place to actuate the brake device 1, the distance between the axis of rotation 20 and the center of curvature 19 of the respective point of contact 21 can be greater than the radius of curvature of the circle of curvature of the respective contact point 21.

Furthermore, it can be provided that in a large part of the rotation that takes place to actuate the brake device 1, the distance between the axis of rotation 20 and the center of curvature 19 of the respective point of contact 21 is less than ten times, in particular five times, particularly preferably three times, the radius of curvature of the circle of curvature of the respective point of contact 21.

It can preferably be provided that the first rolling curve is substantially an arc of a circle. The second rolling curve can also be substantially an arc of a circle. The circular arc shape results in kinematics between the spreading element 12 and the actuation surfaces 7, 10 that are mathematically easy to grasp and structurally easy to implement. In the case of a circular arc as the rolling curve, the center of curvature 19 corresponds to the circular arc center, wherein the position of the axis of rotation 20 when the rolling curve rolls on a flat first rolling surface 14 can be represented mathematically as a cycloid 39, in particular as an elongated cycloid 39.

Figure 4:
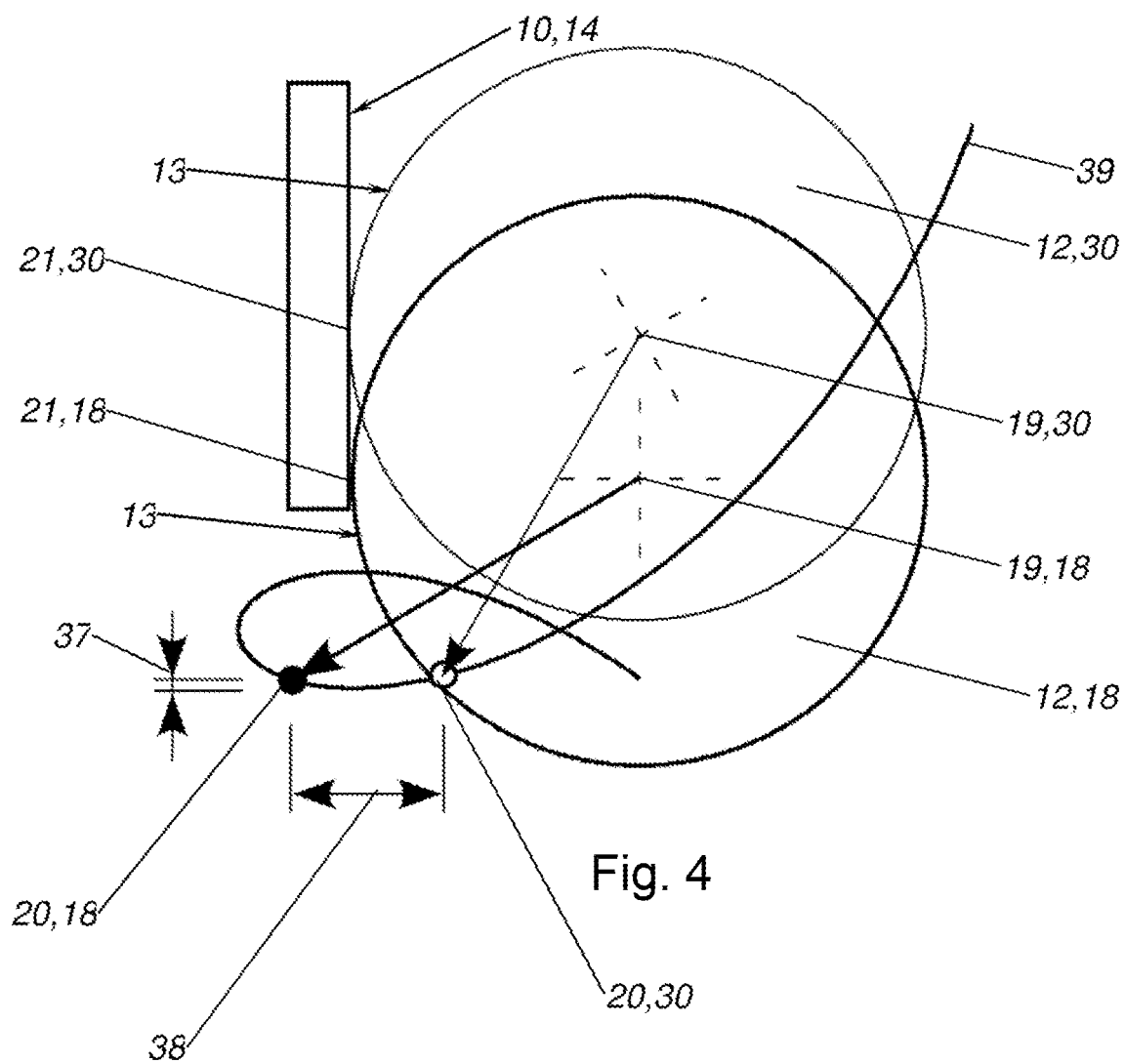
FIG. 4 is an illustration of the rolling movement of the spreading element according to the preferred embodiments of the brake device.

In FIG. 4, the course of the cycloid 39 is shown by way of example for these boundary conditions with an imagined positionally fixed first rolling surface 14, wherein the rolling curve of the first spreading element surface 13 is shown both in the starting position 18 and in the end position 30. From the starting position 18 to the end position 30, the axis of rotation 20 moves along the cycloid between these points. As can be clearly seen in FIG. 4, there is a large deflection 38 along the first straight line in a certain angular range, with a simultaneous minimal error 37 parallel to the second straight line. By simply making use of this relationship, the brake device 1 can be designed in such a way that the pressing part 9 can be guided linearly opposite the brake caliper 2 simply by rolling the first spreading element surface 13 on the first rolling surface 14 and, if necessary, rolling the second spreading element surface 22 on the second rolling surface 24, without further compensation devices and with little play. It goes without saying that this relationship is not limited to the shape of the circular arc as a rolling curve, but that this is used for an easily understandable representation. By optimizing the rolling curve numerically, for example, the error 37 can be further reduced.

Furthermore, it can be provided that when the spreading element 12 is rotated to actuate the brake device 1, a distance measured normal to the first straight line between a center point of the first spreading element surface 13 and a center point of the second spreading element surface 22 increases continuously. The center can correspond to the respective center of curvature.

It can be provided that the spreading element surfaces 13, 22 and the actuation surfaces 7, 10 are arranged in a plane normal to the axis of rotation 20 of the spreading element 12.

However, it can preferably be provided that the spreading element surfaces 13, 22 and the actuation surfaces 7, 10, viewed along the axis of rotation 20, are divided such that the axis of rotation 20 of the spreading element is free of tilting moments. As a result, a particularly compact design of the brake device 1 can be achieved.

It can preferably be provided that the brake device 1 has a wear adjuster 26. A wear adjuster 26 is a component which compensates for the constant wear of the brake linings on the frictional surfaces 6, 9.

It can preferably be provided that the pressing part 8 comprises the wear adjuster 26, and that the first actuating surface 7 is divided into two parts and is arranged on both sides of the wear adjuster 26. Since the wear adjuster 26 is a component with a certain height, the brake device 1 can easily be adapted to the limited installation space available in a car.

As can be seen in FIG. 2, it can preferably be provided that the spreading element 12 is mounted on two roller bearings 23, which are also arranged on both sides of the wear adjuster 26.

It can preferably be provided that the brake device 1 has a guide receiving area 27 for connection to a bearing component 4 with the formation of a mounting of the brake device 1 that is displaceable in the direction of a first straight line. Here, the bearing component 28 can be part of the remainder of the wheel bearing on which the braking device 1 is attached to the bearing 27. The bearing component 28 is mounted on the brake element 11 in such a way that the position of the brake element 11 relative to the bearing component 28 is constant when viewed parallel to the first straight line. The bearing component 28 can in particular be mounted so as to be rotatable relative to the brake element 11.

Furthermore, a brake arrangement comprising the brake device 1, the brake element 11 and the bearing component 28 can be provided, wherein the brake device 1 is mounted on the bearing component 28 such that it can be displaced in the direction of the first straight line. Here, the bearing component 28 can have a guide rod running in the direction of the first straight line, wherein part of the guide rod is arranged within the guide receiving area 27 so that the brake device 1 can be displaced on the guide rod in the direction of the first straight line. The guide rod can have a free end over which the brake device 1 can be attached. The bearing component 28 is mounted on the brake body 11 in such a way that the position of the brake element 11 relative to the bearing component 4 is constant when viewed parallel to the first straight line. The bearing component 28 can in particular be mounted so as to be rotatable relative to the brake element 11.

It can preferably be provided that at least one return spring is provided, wherein a spring force of the return spring causes the two frictional surfaces to move apart. This means that when the spreading element 12 is returned to the initial position 18 after a brake actuation, the return spring also returns the pressing part 8 into a starting position relative to the brake caliper 2. As a result, grinding of the frictional surfaces 6, 9 on the brake element 11 when the brake device 1 is released can be avoided.

It can particularly preferably be provided that a movement damping part 29 coupled to the spreading element 12 for damping a translational movement of the spreading element 12 with respect to the bearing component 28 is formed in the guide receiving area 27 parallel to the first straight line. The movement damping part 29 can be held in a fixed position relative to the axis of rotation 20 of the spreading element 12, in particular when viewed parallel to the first straight line. Particularly when the spreading element 12 rolls on both actuation surfaces 7, 10, viewed from the axis of rotation 20 of the spreading element 12, the two actuation surfaces 7, 10 are actuated on both sides. The spreading element 12, and in particular the axis of rotation 20 of the spreading element 12, therefore defines a point or area, relative to which the two friction surfaces 6, 9 are moved on both sides. The movement damping part 29 has the effect of damping a relative movement of the spreading element 12 with respect to the bearing component 28 to a greater extent than the relative movements of the brake caliper 2 and the pressing part 8 relative to the bearing component 28. As a result, when the brake device 1 is actuated, both frictional surfaces 6, 9 are fed to the brake element 11 on both sides and are lifted off the brake element 11 again after the brake device 1 is released. As soon as one of the two frictional surfaces 6, 9 is in contact with the brake element 11, the pressing force is higher than the resistance force of the movement damping part 29, as a result of which the spreading element 12 can re-center itself with respect to the brake element 11 with each braking process.

It can preferably be provided that the guide receptacle 27 is part of the brake caliper 2, and that the movement damping part 29 is a pin 40 which is movably mounted in the guide receiving area 27 in the direction of the first straight line and which has a frictional force on the bearing component 28. The pin 40 is mechanically coupled in the direction of the first straight line to the position of the axis of rotation 20 of the spreading element 12, so that the position of the axis of rotation 20 of the spreading element 12 follows the pin 40. This coupling between the axis of rotation 20 of the spreading element 12 and the pin 40 is indicated in FIG. 3 by means of a connecting line. In the event of an actuation of the brake device 1, the pin 40 remains substantially fixed in relation to the bearing component 28, while the brake caliper 2 and the pressing part 8 move relative to the pin 40 and the bearing component.

It can preferably be provided that the movement damping part 29 has a fastening component, that the guide receiving area 3 is part of the fastening component, and that the brake caliper 2 and the pressing part 8 are guided linearly on the fastening component substantially along the first straight line. The movement damping part 29 therefore forms a third component of the brake device 1, via which the brake device 1 is mounted on the bearing component 28 and on which the brake caliper 2 and the pressing part 8 are mounted. As a result, the movement of the brake caliper 2 and the pressing part 8 is decoupled from the bearing component 28 in a simple manner, since the brake caliper 2 and the pressing part 8 are mounted on the movement damping part 5.

The invention claimed is:

1. A brake device comprising:
   a brake caliper having a first leg, a second leg and a connecting section connecting the first leg to the second leg;
   wherein a first frictional surface is arranged on a first inner side of the first leg, and a first actuation surface is arranged on a second inner side of the second leg;
   wherein a pressing part of the brake device on the brake caliper is linearly guided along a first straight line;
   wherein the pressing part has a second frictional surface facing the first frictional surface and a second actuation surface faces away from the second frictional surface;
   wherein a region between the first frictional surface and the second frictional surface is provided for the arrangement of a brake element;
   wherein the brake device has a rotatable spreading element which interacts with the first actuation surface and the second actuation surface;
   wherein, when the spreading element is rotated to actuate the brake device, a first spreading element surface is in direct contact with a first rolling surface and rolls substantially on the first rolling surface, and that the first rolling surface corresponds to the first actuation surface or the second actuation surface;
   wherein a profile of the first spreading element surface forms a first rolling curve;
   wherein the first rolling curve has at least one center of curvature;
   wherein, with at least 80% of an operating angle range of the rotation of the spreading element that takes place to actuate the brake device, the axis of rotation of the spreading element is arranged in front of the center of curvature of a point of contact viewed from the point of contact of the first rolling curve in a direction of the first straight line; and
   wherein the first rolling surface spans a plane normal to the first straight line, the spreading element, the pressing part, and the brake caliper arranged so that a further axis of rotation of the spreading element in a starting position and another axis of rotation of the spreading element in an end position are arranged on opposite sides of the plane of the rolling surface.

2. The brake device according to claim 1, wherein, in order to rotate the spreading element, the spreading element is operatively connected to an electric motor via an actuation mechanism.

3. The brake device according to claim 2, wherein the actuation mechanism comprises a non-linear translation between a rotation of the electric motor and a rotation of the spreading element.

4. The brake device according to claim 1, wherein:
   on one edge of the first rolling surface, a support surface is integrally formed which is arranged obliquely to the first rolling surface for the first spreading element surface; and
   the support surface supports the first spreading element surface in a starting position of the spreading element against forces transverse to the first straight line.

5. The brake device according to claim 1, wherein the first rolling curve is substantially a circular arc.

6. The brake device according to claim 1, wherein the spreading element is mounted on a second spreading element surface in a roller bearing, on the actuation surface which is not the first rolling surface.

7. The brake device according to claim 6, wherein the roller bearing is a needle bearing.

8. The brake device according to claim 6, wherein the roller bearing is at least partially in the shape of a cylinder jacket.

9. The brake device according to claim 1, wherein, when the spreading element rotates to actuate the brake device, a second spreading element surface is in direct contact with a second rolling surface and substantially rolls on the second rolling surface, and the second rolling surface corresponds to the actuation surface which is not the first rolling surface.

10. The brake device according to claim 1, wherein the spreading element has a guide at its axis of rotation, and the guide supports the axis of rotation of the spreading element against forces transverse to the first straight line, at least in an initial range of the rotation of the spreading element against the brake caliper for actuating the brake device.

11. The brake device according to claim 1, wherein the pressing part comprises a wear adjuster, and the first actuation surface is divided into two parts and is arranged on both sides of the wear adjuster.

12. The brake device according to claim 1, wherein the brake device has a guide receiving area for connection to a bearing component with the formation of a bearing of the brake device which can be displaced in the direction of a first straight line.

13. The brake device according to claim 12, wherein a movement damping part coupled to the spreading element for damping a translational movement of the spreading element with respect to the bearing component is formed in the guide receiving area parallel to the first straight line.

14. Wheel bearing comprising a brake disk as a brake element and a brake device according to claim 1, wherein an axis of rotation of the brake disk runs parallel to the first straight line.

15. A vehicle comprising at least one wheel bearing according to claim 14.

\* \* \* \* \*